US008485530B2

(12) United States Patent
Johansson et al.

(10) Patent No.: US 8,485,530 B2
(45) Date of Patent: Jul. 16, 2013

(54) AXIAL FACE SEAL ASSEMBLY

(75) Inventors: Johanna Johansson, Enskededalen (SE); Johan Fondelius, Sollentuna (SE)

(73) Assignee: Xylem IP Holdings LLC, White Plains, NY (US)

( * ) Notice: Subject to any disclaimer, the term of this patent is extended or adjusted under 35 U.S.C. 154(b) by 22 days.

(21) Appl. No.: 13/319,833

(22) PCT Filed: May 5, 2010

(86) PCT No.: PCT/SE2010/050494
§ 371 (c)(1),
(2), (4) Date: Jan. 17, 2012

(87) PCT Pub. No.: WO2010/132010
PCT Pub. Date: Nov. 18, 2010

(65) Prior Publication Data

US 2012/0112417 A1 May 10, 2012

(30) Foreign Application Priority Data

May 11, 2009 (SE) ....................................... 0950325

(51) Int. Cl.
*F16J 15/40* (2006.01)

(52) U.S. Cl.
USPC ........................................... 277/373; 277/371

(58) Field of Classification Search
USPC .................. 277/361, 633, 371, 372, 373, 390
See application file for complete search history.

(56) References Cited

U.S. PATENT DOCUMENTS

| | | | | |
|---|---|---|---|---|
| 3,689,083 | A * | 9/1972 | Greenawalt | 277/372 |
| 3,841,642 | A * | 10/1974 | Kirker, Jr. | 277/373 |
| 4,213,618 | A * | 7/1980 | Thurber | 277/373 |
| 2006/0061041 | A1 | 3/2006 | Huang | |
| 2010/0038861 | A1* | 2/2010 | Huang | 277/372 |

FOREIGN PATENT DOCUMENTS

| | | | |
|---|---|---|---|
| WO | 2005075861 | A1 | 8/2005 |
| WO | 2009113942 | A1 | 9/2009 |

OTHER PUBLICATIONS

International Search Report issued in PCT/SE2010/050494 filed May 5, 2010, mailed May 19, 2010.
Written Opinion of the International Searching Authority issued in PCT/SE2010/050494, mailed May 19, 2010.

* cited by examiner

*Primary Examiner* — Gilbert Lee
(74) *Attorney, Agent, or Firm* — RatnerPrestia

(57) ABSTRACT

An axial face seal arrangement, which is arranged for joint rotation with a drive shaft in a rotary machine, includes a base element and a moving part, wherein the base element is connectable to a drive shaft for joint movement therewith, the moving part presenting a sealing end face and being axially movable in relation to the base element and biased from the base element by a spring, wherein the moving part and the base element include at least one torque driver pin and at least one corresponding aperture into which the torque driver pin is displacably inserted for joint rotational movement of the moving part with the base element. At least one wear protection pin is arranged between the torque driver pin and the aperture at a force transmitting interface of the torque driver pin and the aperture.

8 Claims, 4 Drawing Sheets

AXIAL FACE SEAL ASSEMBLY

CROSS REFERENCE TO RELATED APPLICATIONS

This application is the U.S. National Stage Patent Application of PCT/SE2010/050494, filed May 5, 2010, which claims priority to Swedish Patent Application No. SE 0950325-1, filed May 11, 2009, the contents of such applications being incorporated by reference herein.

FIELD OF THE INVENTION

The present invention relates generally to the field of seal assemblies arranged for joint rotation with a drive shaft of a rotary machine. Further, the present invention relates specifically to the field of axial face seal assemblies which effects sealing of the passage of a drive shaft through a housing wall in the rotary machine. The axial face seal assembly comprises a base element and a moving part, wherein the base element is connectable to a drive shaft for joint movement therewith, the moving part presenting a sealing end face and being axially movable in relation to the base element and biased from the base element by means of a spring, wherein the moving part and the base element comprising cooperating torque driver means for joint rotational movement of the moving part with the base element, the torque driver means comprising at least one torque driver pin and at least one corresponding aperture into which said torque driver pin is displacably inserted.

BACKGROUND OF THE INVENTION

The invention is useful for sealing the passage of a drive shaft from a motor compartment to a hydraulic unit in submersible pumps and mixers, etc., albeit other use is conceivable. The submersible pumps and mixers typically comprise an electrically driven motor and a hydraulic unit comprising an impeller/propeller connected to the motor compartment via a drive shaft. In order to prevent medium in the hydraulic unit from entering into the motor along the drive shaft, seal devices are arranged between the hydraulic unit and the motor compartment. A common type of seal device is an axial face seal, also known as a mechanical face seal, comprising a seal member rotating with the drive shaft and abutting/sealing against a stationary seal member which is attached to a housing wall forming part of the motor compartment. The two seal members are pressed towards each other by spring force to prevent medium from entering the sealing interface.

In submersible pumps, for example, a set of two axial face seal assemblies are often installed to provide sealing interfaces at the passages of the drive shaft reaching through a fluid filled housing portion which defines a barrier for the pumped medium, between the motor compartment and the hydraulic unit.

The axial face seal assemblies which are referred to generally comprise a ring-shaped seal member presenting a sealing end face, which is axially movable in relation to a base element of the axial face seal assembly. The seal member is biased towards the stationary seal member on the housing wall by means of a spring, which is supported from the base element. The base element is connectable to the drive shaft for joint movement therewith, i.e. the base element is non-rotatably connectable to the drive shaft at an axially fixed position. The seal member and the base element are likewise non-rotatably connected in relation to each other. Thus, the axial face seal assembly is supported on the drive shaft for joint rotation therewith, and in concentric relation with the drive shaft.

PCT/SE2009/000132, which is incorporated by reference, discloses an axial face seal assembly which comprises a carrier in which the seal member is seated. The carrier comprises three dowels which extend into corresponding dowel holes of the base element, i.e. the dowels functions as torque driver pins and transmits the rotational movement of the drive shaft/base element to the moving part, i.e. the carrier/seal member. However, when the axial face seal assembly is mounted in a submersible pump, suitable for pumping contaminated liquid, it will experience relative movement between the base element and the carrier in the axial direction due to thermal expansion, vibrations, obliquity, etc. In course of time each dowel and dowel hole will wear on each other, i.e. the dowel will tear a slot in the corresponding dowel hole at the torque transmitting interface and the dowel hole will wear on the side of the dowel facing the torque transmitting interface. As a result said side of the dowel will be rough and irregular and the upper edge of the dowel hole may get caught on any undesired irregularity on the dowel. In addition, the dowel may become wedged in the slot in the dowel hole. Thus, the wear will obstruct the axial movement of the carrier/seal member in relation to the base element. As a result the axial face seal assembly will often cause the axial face seal to become overloaded and break or become opened and leak. When the pumped liquid comprises abrasive matter, the working life of the axial face seal assembly will be substantially reduced, since the abrasive matter will function as an abrasive between the dowel and the dowel hole.

SUMMARY OF THE INVENTION

The present invention aims at obviating the aforementioned disadvantages of previously known axial face seal assemblies, and at providing an improved axial face seal assembly. The present invention provides an improved axial face seal assembly of the initially defined type which is structured to ensure that intense axial relative movement between the moving part and the base element does not effect the sealing function of the axial face seal assembly.

The present invention also provides an axial face seal assembly, which at the same time comprises few components.

According to aspects of the invention an axial face seal assembly, arranged for joint rotation with a drive shaft in a rotary machine, comprises a base element and a moving part, wherein the base element is connectable to a drive shaft for joint movement therewith, the moving part presenting a sealing end face and being axially movable in relation to the base element and biased from the base element by means of a spring, wherein the moving part and the base element comprising cooperating torque driver means for joint rotational movement of the moving part with the base element, the torque driver means comprising at least one torque driver pin and at least one corresponding aperture into which said torque driver pin is displacably inserted, wherein at least one wear protection pin is arranged between said torque driver pin and said aperture at a force transmitting interface of the torque driver means.

According to aspects of the present invention, there is provided an axial face seal assembly of the initially defined type, which is characterized in that at least one wear protection pin is arranged between said torque driver pin and said aperture at a force transmitting interface of the torque driver means.

Thus, the present invention relates to the insight that a wear protection means located at the torque transmitting interface of the torque driver means will substantially improve the working life of the axial face seal assembly, since the direct contact and wear of the torque driver means are prevented.

In a preferred embodiment the moving part comprises a seal member and a carrier, the seal member being seated in the carrier and present the sealing end face. Thereby, the seal member and the carrier may be made of different materials.

In a preferred embodiment the moving part comprises the at least one torque driver pin and the base element comprises the cooperating aperture, the wear protection pin being arranged at the trailing side of the at least one torque driver pin in the direction of rotation of the drive shaft.

In a preferred embodiment the moving part also comprises an elastic sleeve, the seal member being seated in said elastic sleeve that is seated in the carrier, the elastic sleeve being arranged to seal against the drive shaft, and the at least one wear protection pin is connected to the elastic sleeve. This means that one and the same component seal against the drive shaft and works as a wear protection for the axial face seal assembly.

In a preferred embodiment the moving part comprises a carrier that comprises three torque driver pins equidistantly spaced in the circumferential direction, and one wear protection pin is arranged at the trailing side of each torque driver pin in the direction of rotation of the drive shaft. Due to the use of three torque driver pins the abutment load in the circumferential direction on each torque driver pin is reduced.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
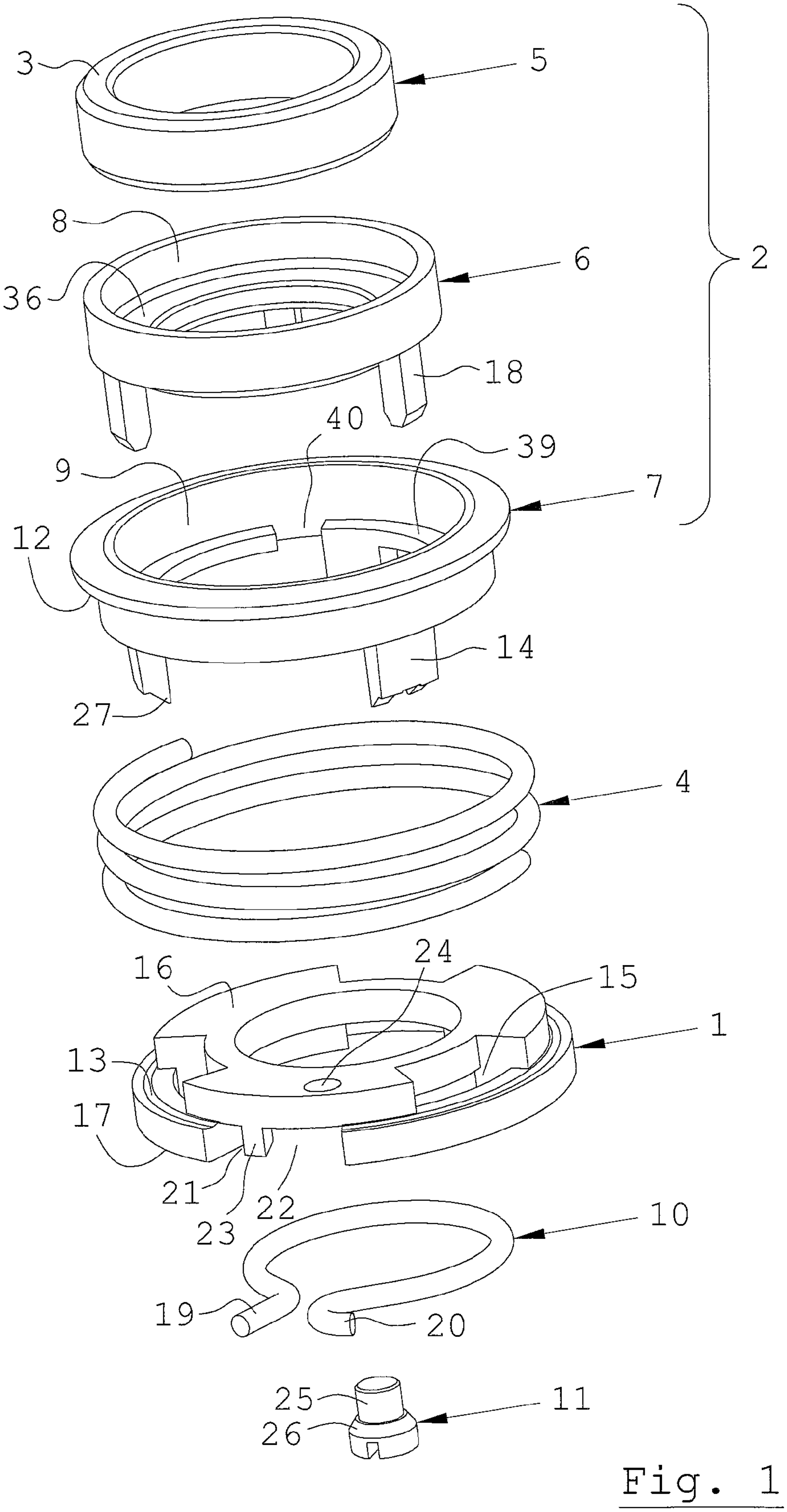
FIG. 1 is an exploded perspective view from above of the inventive axial face seal assembly.

The components comprised in a preferred embodiment of the inventive axial face seal assembly are illustrated in the exploded perspective view FIG. 1. The components are shown in consecutive order from top to bottom of the drawing.

According to aspects of the invention, the axial face seal assembly is arranged for joint rotation with a drive shaft in a rotary machine, and comprises a base element 1 and a moving part 2. The base element 1 is connectable to a drive shaft (not shown) for joint movement therewith, and the moving part 2 present a sealing end face 3 and is axially movable in relation to the base element 1 and biased from the base element 1 by means of a spring 4.

Figure 2:
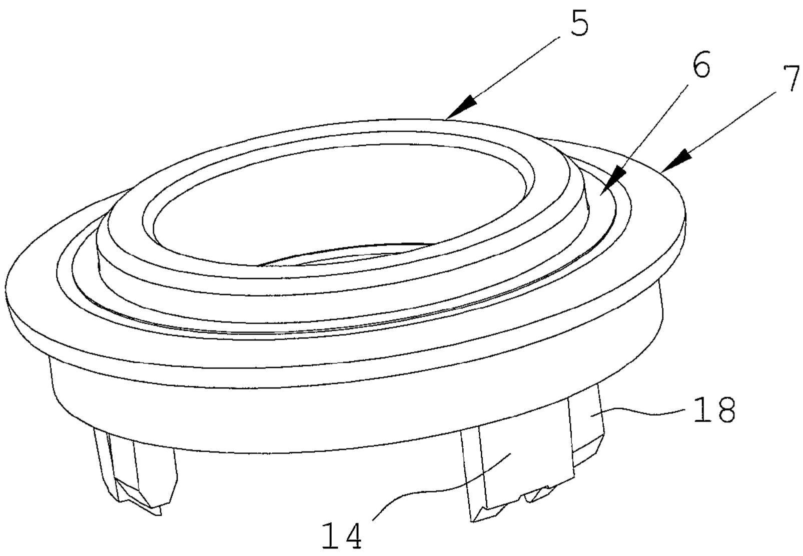
FIG. 2 is an exploded perspective view from above of the moving part of the axial face seal assembly, i.e. the carrier, the elastic sleeve and the seal member, in a mounted state.
Figure 5:
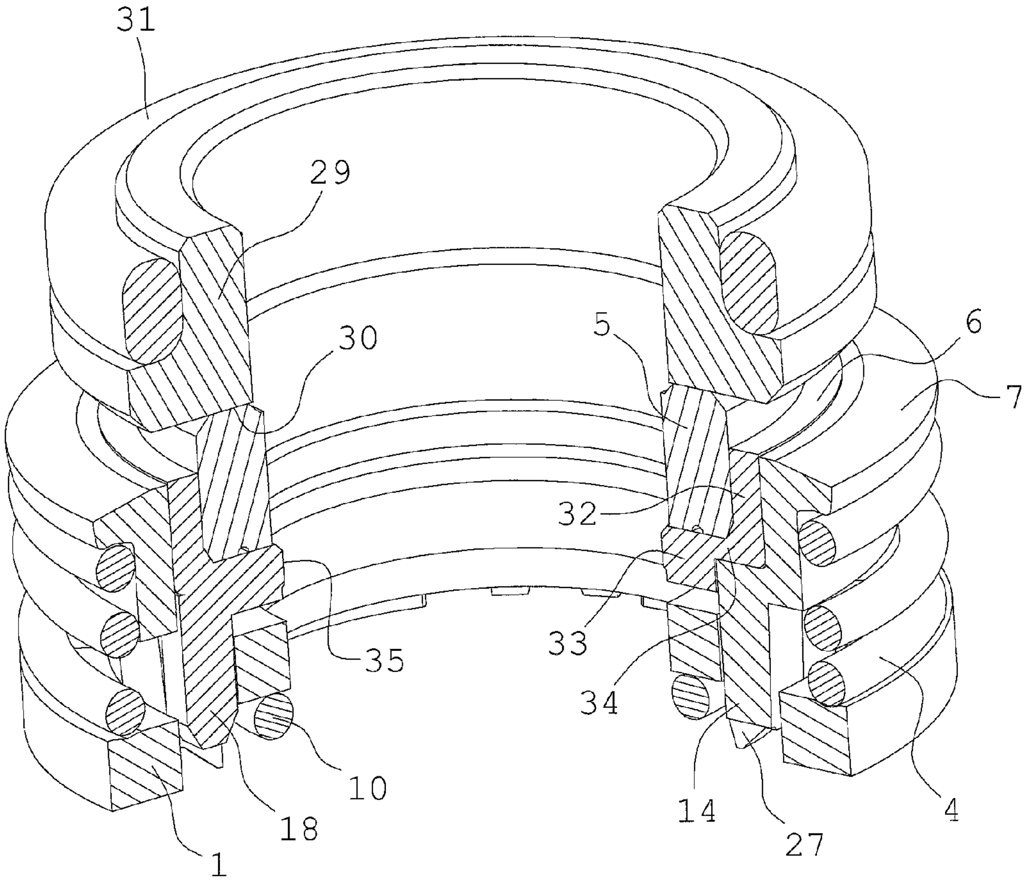
FIG. 5 is a cross sectional perspective view from above of an entire axial face seal.

In a preferred embodiment of the axial face seal assembly, the movable part 2 comprises an annular seal member 5 presenting the sealing end face 3 at its top surface, an elastic sleeve 6, which is made of a heat resistant material in order to withstand the heat which is generated during operation of the axial face seal. The seal member 5 is preferably made of cemented carbide, silicon carbide, aluminium carbide, or the like. The elastic sleeve 6 is arranged to be interposed between the seal member 5 and a carrier 7. In the preferred embodiment the seal member 5 is seated into an axial recess 8 in the elastic sleeve 6, and the elastic sleeve 6 is seated into an axial recess 9 in the carrier 7. According to the preferred embodiment, the seal member 5 is retained in the elastic sleeve 6 by means of friction, and the elastic sleeve 6 is retained in the carrier 7 also by means of friction. Thus, the seal member 5, the elastic sleeve 6 and the carrier 7 are connected for joint movement as a single movable part 2. In the mounted state of the movable part 2, as can be seen in FIG. 2, the seal member 5 protrudes upwards in the axial direction in relation to the carrier 7 and the elastic sleeve 6, in order not to be interfered during sealing operation of the axial face seal assembly as can be seen in FIG. 5 and explained hereinafter.

The base element 1 is connectable to the drive shaft, around which the axial face seal assembly is arranged to be mounted, for joint movement therewith. Thus, the base element 1 is axially and non-rotatably securable to the drive shaft by means of any suitable means, which in the preferred embodiment is constituted by an open ring clamp 10. The ring clamp 10 is arranged to be housed in the inner periphery of the base element 1 (as is best understood from FIGS. 4 and 5.) The ring clamp 10 is compressible in the circumferential direction by means of a tightening means 11, such as an adjusting screw or locking screw, which is rotatably journalled in the base element 1. The spring 4 is arranged to exert an axial force between the carrier 7 and the base element 1, in order to bias the carrier 7 and the seal member 5 away from the base element 1. In the preferred embodiment the spring 4 is constituted by a compression coil spring acting between an outwardly extending radial flange 12 of the carrier 7 and an outwardly extending radial flange 13 of the base element 1. When the axial face seal assembly is mounted around the drive shaft the seal member 5, the elastic sleeve 6 and the carrier 7 are axially movable along the drive shaft, at the same time as the elastic sleeve 6 seals against the envelope surface of the drive shaft as will be explain hereinafter.

According to aspects of the invention, the moving part 2 and the base element 1 comprises cooperating torque driver means for joint rotational movement of the moving part 2 with the base element 1. The torque driver means comprises at least one torque driver pin 14 and at least one corresponding aperture 15 into which said torque driver pin 14 is inserted. In a preferred embodiment, the moving part 2 comprises the torque driver pin 14 and the base element 1 comprises the aperture 15. However, the opposite condition may apply, in which the moving part 2 comprises the aperture 15 and the base element 1 comprises the torque driver pin 14 (embodiment not shown).

Returning to the embodiment shown in the drawings. The at least one torque driver pin 14 is connected to the carrier 7 and is arranged to project downwards therefrom. Preferably, the carrier 7 comprises three torque driver pins 14, which are equidistantly spaced in the circumferential direction of the carrier 7, and the base element 1 comprises three corresponding apertures 15, in order to decrease the force acting on each torque driver pin 14 and aperture 15, respectively, during operation.

The torque driver pins 14 are dimensioned for insertion in the axial direction in the corresponding apertures 15 mouthing in the top surface 16 of the base element 1, i.e. the base element 1 comprises as many apertures 15 as the carrier 7 comprises torque driver pins 14. In the preferred embodiment, said apertures 15 also mouths in the bottom surface 17 of the base element 1 as will be explain in connection with FIG. 4. In result of the torque driver pins 14 engaging the apertures 15, the carrier 7 is arranged for joint rotational movement with the base element 1, but movable relative thereto in the axial direction.

The axial face seal assembly comprises at least one wear protection pin 18, which is arranged between the torque driver pin 14 and the aperture 15 at a force transmitting interface of the torque driver means. In the shown embodiment the force transmitting interface is the interface between the trailing side of the torque driver pin 14 and of the aperture 15, in the direction of rotation R of the drive shaft (see FIG. 4). Thus, the trailing side of each torque driver pin 14 is in this context, in the circumferential direction, the side of the torque driver pin 14 against which the aperture 15 of the base element 1 acts in order to bring the carrier 7 and the seal member 5 to joint rotate with the drive shaft and the base element 1. In the preferred embodiment the axial face seal assembly comprises one wear protection pin 18 for each pair of torque driver pin 14 and aperture 15. The object of the wear protection pin 18 is to prevent the torque driver pin 14 and the aperture 15 from rubbing against each other when the carrier 7 moves in the axial direction in relation to the base element 1. Preferably, the wear protection pin 18 is made of a heat resistant material in order to withstand the heat which is generated during operation of the axial face seal.

Figure 3:
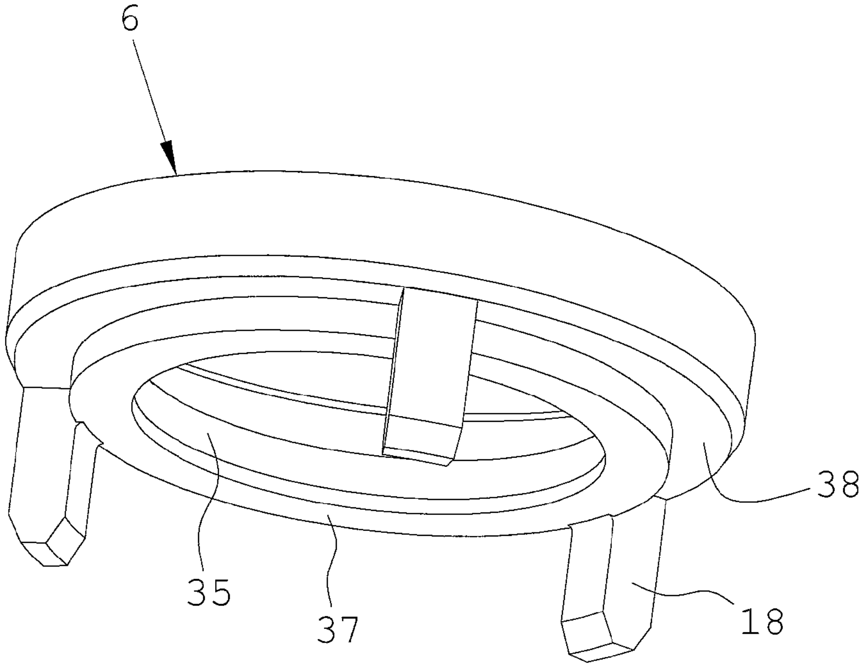
FIG. 3 is a perspective view from below of a preferred embodiment of the elastic sleeve.

Reference is now especially made to FIGS. 2 and 3. The axial face seal assembly comprises in the shown preferred embodiment three wear protection pins 18 connected to the elastic sleeve 6 and projecting downwards therefrom. The object of having the wear protection pins 18 integrated with the elastic sleeve 6 is to facilitate the manufacturing and mounting procedure and to keep the number of components of the axial face seal assembly to a minimum.

Reference is now made to FIGS. 1 and 5. The open ring clamp 10 comprises a circular main portion, arranged to enclose the drive shaft when mounted. Furthermore, the ring clamp 10 comprises a first end 19 and a second end 20, which are arranged to be received in a first seat 21 and a second seat 22, respectively, formed in the bottom end of the base element 1. The first seat 21 and the second seat 22 are separated through an intermediate base element section 23. The base element section 23 acts as a retaining support for the first end 19 of the ring clamp 10, which is firmly seated in the first seat 21. The second end 20 is received movable in the second seat 22, which is separated from the first seat 21 through the intermediate base element section 23.

The base element 1 further comprises a hole 24 that mouth in the second seat 22 and that is arranged for threaded engagement with a threaded portion 25 on the adjusting screw 11. The threaded portion 25 adjoins a frusto-conical portion 26, which operatively engages the second end 20 of the ring clamp 10. The adjusting screw 11 is screwed into the hole 24 in a direction parallel with the longitudinal axis of the axial face seal assembly in order to increase the accessibility for adjusting the adjusting screw 11 during mounting and demounting of the axial face seal assembly.

When the adjusting screw 11 is rotated deeper into the base element 1, the frusto-conical portion 26 urges the second end 20 towards the first end 19 of the ring clamp 10, reducing the diameter of the ring clamp 10 for a frictional clamping about the circumference of the drive shaft. This way, the base element 1 is non-rotatably and axially arrested in concentric relation with the drive shaft by tightening of the ring clamp 10. It will be realized that the ring clamp 10 has an inner diameter which is equal to or larger than an inner most diameter of the annular base element 1 in the un-tightened condition of the ring clamp 10. It is equally realized that the ring clamp 10 may be compressed, i.e. when separate from the drive shaft, to an inner diameter which is less then the outer diameter of the drive shaft.

The second end 20 of the ring clamp 10 is in the shown preferred embodiment semi-circular in order to get an engagement with the frusto-conical portion 26 of the adjusting screw 11 which, when the adjusting screw 11 is screwed into the hole 24, entail that the entire second end 20 is urged towards the first end 19. If the second end 20 of the ring clamp 10 is shaped as the first end 19, the second end 20 may bend without reducing the diameter of the circular main portion of the ring clamp 10.

The ring clamp 10 may have a polygonal, or a rounded or a circular sectional profile. Optionally, the ring clamp 10 may be semi-circular in section and formed to have a planar inner diameter, i.e. in a D-shaped sectional profile. The second end 20 may likewise be formed in correspondence with the slanting angle of the frusto-conical portion 26, if appropriate.

Figure 4:
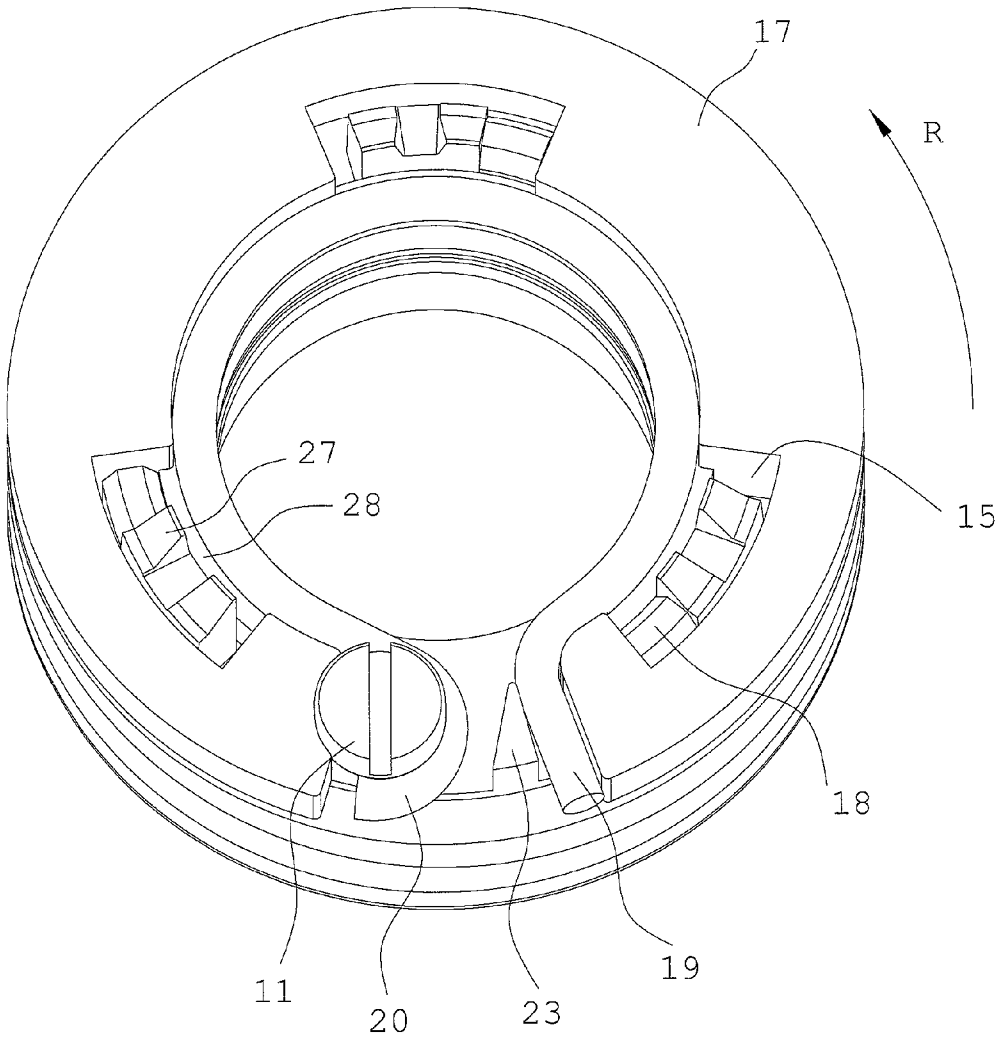
FIG. 4 is a perspective view from below of the axial face seal assembly in a mounted state.

Reference is now made to FIG. 4. In view of providing a simplified handling of the axial face seal assembly, the torque driver pins 14 are advantageously shaped to lock the carrier 7 and base element 1 in assembled relation when the torque driver pins 14 are inserted in the apertures 15. In the preferred embodiment, the bottom ends of the torque driver pins 14 are formed with tongues 27 which after mounting are deformed in order to widen the torque driver pin 14 end. When the tongues 27 are in the deformed state, they will extend over a flange 28 of the base element 1. The tongues 27 will abut the flange 28 of the base element 1 and will determine thus when the axial face seal assembly is in the fully expanded state. This will simplify the handling of the axial face seal assembly, as it will remain in one piece during storing and mounting.

Reference is now made to FIG. 5, which shows the axial face seal assembly when mounted in concentric relation about a drive shaft in a rotary machine, and in engagement with a stationary seal member 29. Albeit the drive shaft and rotary machine are not illustrated in FIG. 5 it will be understood that the seal member 5 with its sealing end face 3, in mounted position on the drive shaft, is forced by the compressed spring 4 to effect a sealed interface in cooperation with a sealing end face 30 of the stationary seal member 29, which is stationary arranged in the rotary machine housing. A seal 31 made of heat resistant material is arranged between the stationary seal member 29 and the rotary machine housing.

The elastic sleeve 6 comprises an upper cylindrical portion 32 separating the seal member 5 and the carrier 7 in the radial direction, a lower cylindrical portion 33, and a the upper and lower cylindrical portions interconnecting radial portion 34. The lower cylindrical portion 33 presents an inner surface 35 which is arranged to seal against the envelope surface of the drive shaft, an upper surface 36 (see FIG. 1) against which the seal member 5 is received, and a lower surface 37 (see FIG. 3) against which the upper surface 16 of the base element 1 abuts when the axial face seal is in a fully compressed state. It should be pointed out that the travel distance of the movable part 2, i.e. the carrier 7, between the fully extended and fully compressed state is in the shown preferred embodiment about 2 mm, and when the axial face seal assembly is mounted the carrier 7 is set at a predetermined position between these two end positions, preferably at a position halfway therebetween. The radial portion 34 comprises a lower surface 38 which abuts an upper surface of a radial flange 39 of the carrier 7.

The radial flange 39 comprises a set of recesses 40 for accommodating the wear protecting pins 18 of the elastic sleeve 6.

The invention is not limited only to the embodiments described above and shown in the drawings, which primarily have an illustrative and exemplifying purpose. The present invention is defined by the wording of the appended claims and the equivalents thereof. Thus, the axial face seal assembly may be modified in all kinds of ways within the scope of the appended claims.

For instance, it should be pointed out that the means for securing the base element on the drive shaft may be any other known or suitable means besides the open ring clamp shown, e.g. key and key groove, a locking screw acting radially inwards against the drive shaft, a adjusting screw acting in the circumferential direction of the base element, etc.

It shall also be pointed out that although the term "torque driver means, i.e. the torque driver pin and the aperture" for sake of simplicity have been used in the claims as well as in the description, it shall be realized that it is capable of transmitting/conveying a rotational movement from the base element to the moving part/carrier, and not only the torque.

It should be pointed out that the force transmitting interface of the torque driver means, is the leading side of the follower pin when the follower pin is connected to the stationary part of the axial face seal assembly, and is the trailing side of the follower pin when the follower pin is connected to the moving part of the axial face seal assembly.

It should also be pointed out that each wear protection pin may be an individual component retained between the corresponding torque driver pin and the aperture in any suitable way, e.g. by being vulcanized to either the torque driver pin or the aperture. Moreover, the aperture may present upper and lower shoulders which prevent a loose wear protection pin from escaping.

It shall also be pointed out that all information about/concerning terms such as above, below, under, upper, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even though it is not explicitly stated that features from a specific embodiment may be combined with features from another embodiment, the combination shall be considered obvious, if the combination is possible.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

The invention claimed is:

1. An axial face seal assembly, arranged for joint rotation with a drive shaft in a rotary machine, the axial face seal assembly comprising:

a base element and a moving part, wherein the base element is connectable to a drive shaft for joint movement therewith, the moving part presenting a sealing end face and being axially movable in relation to the base element and biased from the base element by a spring, cooperating torque driver means for joint rotational movement of the moving part with the base element, the torque driver means comprising at least one torque driver pin and at least one corresponding aperture into which said torque driver pin is displacably inserted, wherein at least one wear protection pin is arranged between said torque driver pin and said aperture at a force transmitting interface of the torque driver means.

2. The axial face seal assembly according to claim 1, wherein the moving part comprises the at least one torque driver pin and the base element comprises the corresponding aperture, the wear protection pin being arranged at a trailing side of the at least one torque driver pin in a direction of rotation of the drive shaft.

3. The axial face seal assembly according to claim 1, wherein the moving part comprises a seal member and a carrier, the seal member being seated in the carrier and present the sealing end face.

4. The axial face seal assembly according to claim 3, wherein the carrier comprises the at least one torque driver pin.

5. The axial face seal assembly according to claim 3, wherein the moving part also comprises an elastic sleeve, the seal member being seated in said elastic sleeve that is seated in the carrier, the elastic sleeve being arranged to seal against the drive shaft.

6. The axial face seal assembly according to claim 5, wherein the at least one wear protection pin is connected to the elastic sleeve.

7. The axial face seal assembly according to claim 1, wherein the at least one wear protection pin is attached to the at least one torque driver pin, or to the corresponding aperture.

8. The axial face seal assembly according to claim 1, wherein the moving part comprises a carrier that comprises three torque driver pins equidistantly spaced in a circumferential direction, and one wear protection pin is arranged at a trailing side of each torque driver pin in a direction of rotation of the drive shaft.

* * * * *

UNITED STATES PATENT AND TRADEMARK OFFICE

CERTIFICATE OF CORRECTION

PATENT NO. : 8,485,530 B2
APPLICATION NO. : 13/319833
DATED : July 16, 2013
INVENTOR(S) : Johansson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 84 days.

Signed and Sealed this
Eighth Day of September, 2015

Michelle K. Lee
*Director of the United States Patent and Trademark Office*